May 26, 1959 V. H. SELIGER ET AL 2,888,630
MAGNETIC CONTROLLER
Filed March 14, 1957 2 Sheets-Sheet 1

INVENTORS
VICTOR H. SELIGER
WILLIAM J. VAFIADES
BY
*Victor D. Boret*
ATTORNEY

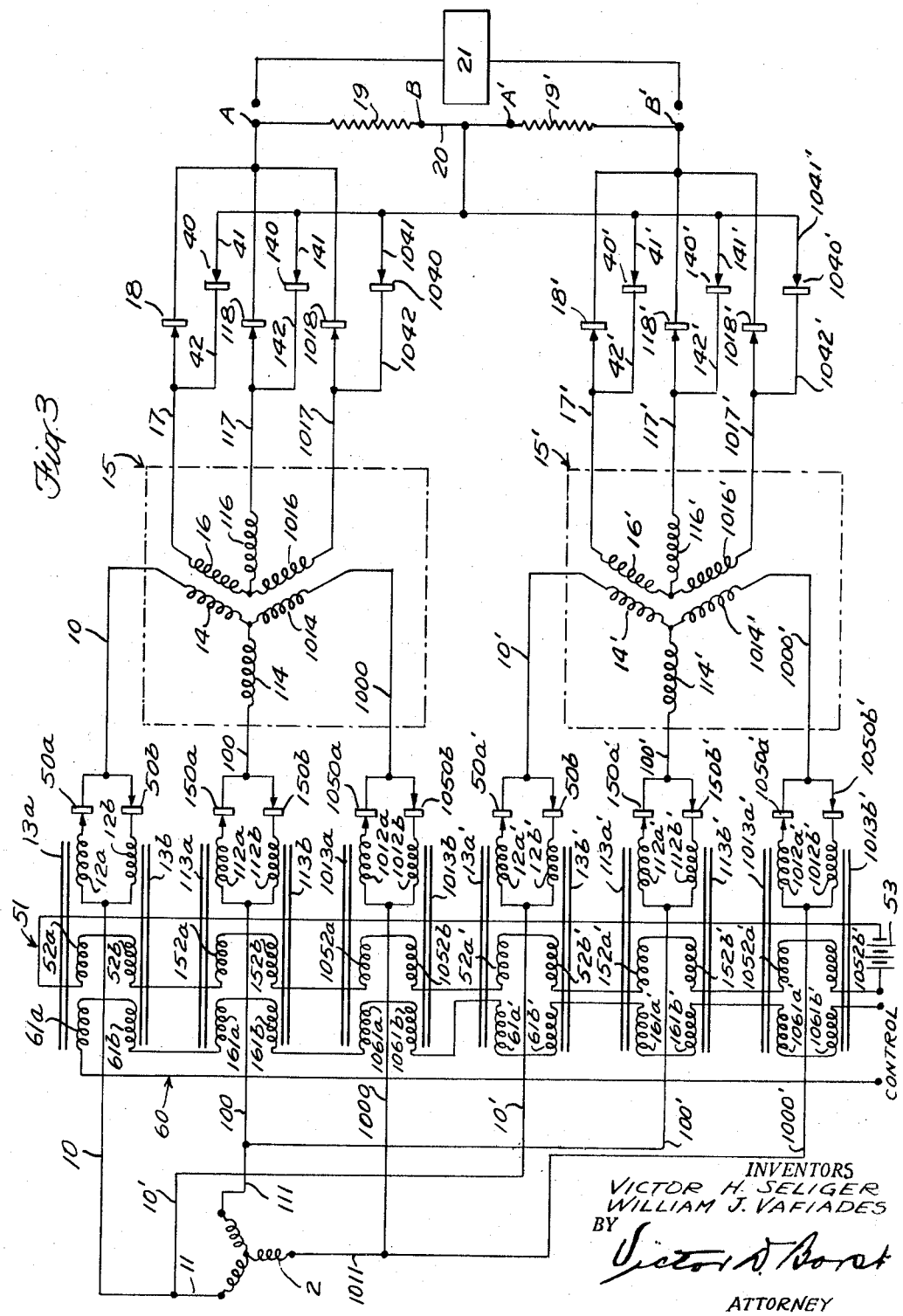

United States Patent Office 2,888,630
Patented May 26, 1959

2,888,630
MAGNETIC CONTROLLER

Victor H. Seliger, Kew Gardens, and William J. Vafiades, Corona, N.Y., assignors to Sperry Rand Corporation, Ford Instrument Company Division, Long Island City, N.Y., a corporation of Delaware Application March 14, 1957, Serial No. 646,122

7 Claims. (Cl. 321—25)

This invention relates to control systems employing saturable reactors and more particularly to an improved reversible magnetic controller for highly reactive loads.

The variation, interruption or reversal of current in a highly reactive load normally overtaxes its control system with attendant problems of high maintenance, short life and undesirable transient behaviors. Every reduction in reactive load current, and especially interruption or reversal, is associated with field energy which must be dissipated at high power levels for rapid rates of control. Arcing, overheating of components and voltage fluctuations are commonly encountered in conventional control circuits for reactive loads.

In general, the invention contemplates the provision of two parallel circuits across an A.C. line, each of which comprises in series the primary winding of a power transformer and a saturable reactor with a control circuit. The secondary windings of the power transformers are connected across separate series circuits of a unidirectional device and a resistor, the series circuits being oppositely poled and interconnected at two resistor terminals, one terminal from each resistor. A reactive load connected across the other two resistor terminals will be energized with a D.C. current by the half wave rectifier circuit of either transformer as dictated by which of the two saturable reactors is saturated. The degree of saturation of one of the saturable reactors will govern the magnitude of the output D.C. load current and the selection of which reactor is being saturated will govern the polarity of the D.C. voltage as applied to the reactive load. The field energy associated with any current change is smoothly absorbed by the resistors and the magnetic fields of the saturable reactors without erratic behavior or overtaxing of the circuit elements.

Figure 1:
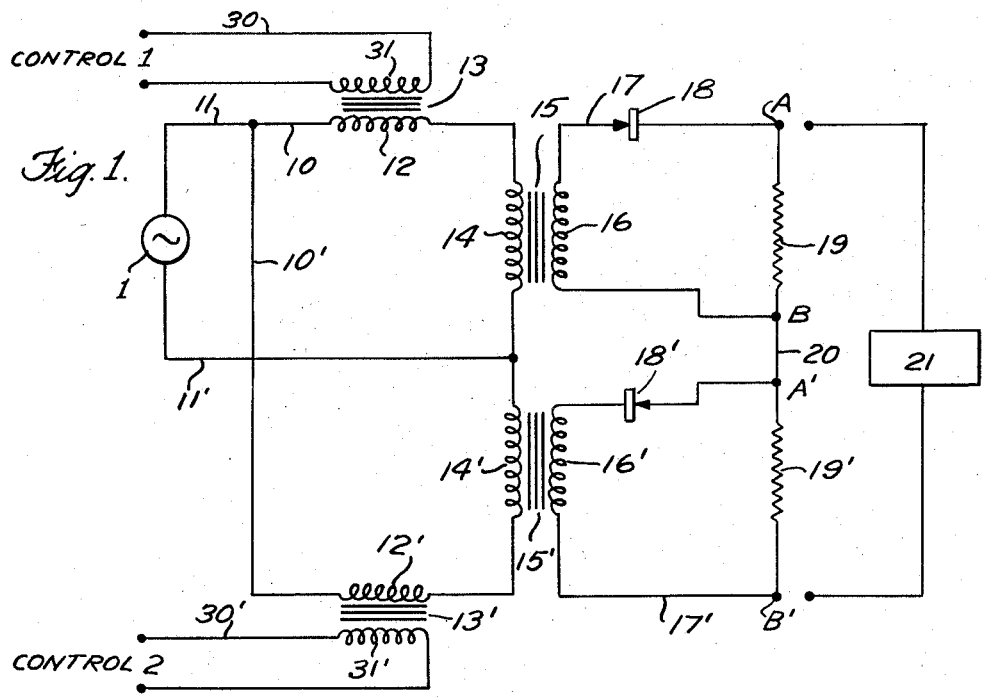
Figure 2:
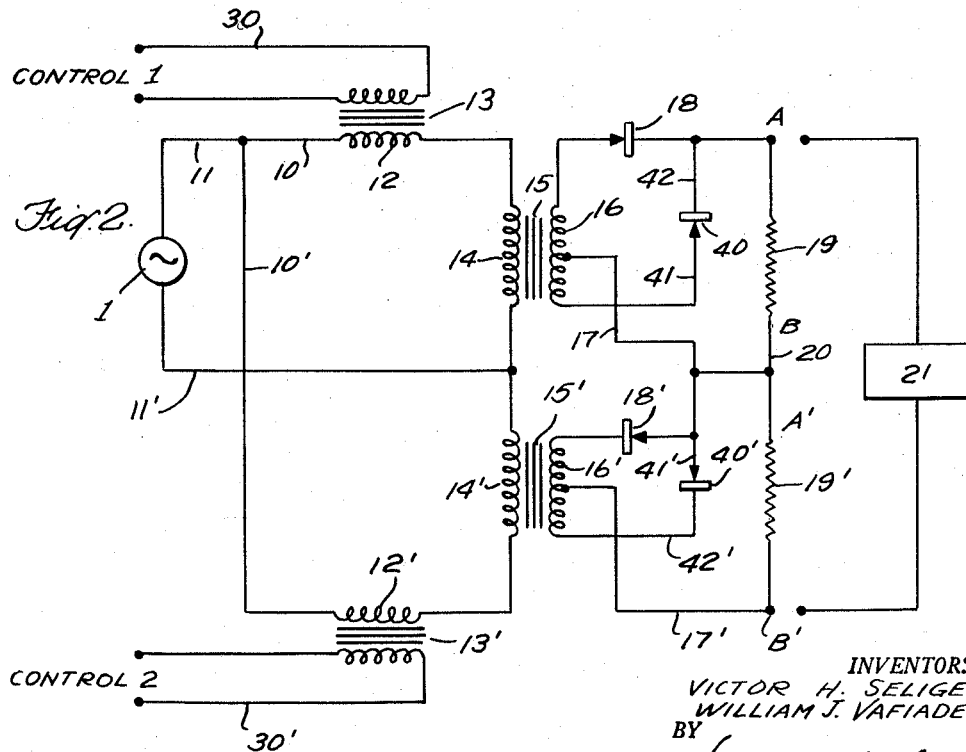

The features of the invention will be understood more clearly from the following detailed description taken in conjunction with the accompanying drawings; in which Fig. 1 is a schematic diagram of a reversible single phase half wave magnetic controller connected to a reactive load;

Fig. 2 is a modification of the schematic diagram of Fig. 1 for single phase full wave operation; and Fig. 3 is a schematic diagram of a reversible three phase magnetic controller connected to a reactive load.

Referring to Fig. 1, two primary circuits 10 and 10' are connected across conductors 11 and 11' of an A.C. line which is energized by a single phase A.C. voltage source 1. Primary circuit 10 is a series circuit of a reactor winding 12 disposed on a saturable magnetic core 13 and a primary winding 14 of a transformer 15. Similarly, primary circuit 10' is a series circuit of a reactor winding 12' disposed on a saturable magnetic core 13' and a primary winding 14' of a transformer 15'. The secondary winding 16 and 16' of the transformer 15 and 15' are connected to output circuits 17 and 17' respectively. Output circuit 17 is a series circuit of a secondary unidirectional device 18 and a resistor 19 having terminals A and B. Similarly, output circuit 17' is a series circuit of a secondary unidirectional device 18' and a resistor 19' having terminals A' and B'. Series output circuits 17 and 17' are interconnected by a conductor 20 which connects terminal B of resistor 19 with terminal A' of resistor 19'. Secondary unidirectional devices 18 and 18' are both poled away from the conductor 20. A reactive load 21 to receive pulsating D.C. half wave energization may be connected across resistor terminals A of the resistor 19 and B' of the resistor 19'. Either core 13 or 13' is saturated by independent control circuits 30 or 30', respectively. Control circuits 30 and 30' include a control winding 31 and 31' disposed on the saturable cores 13 and 13', respectively. When control circuit 30 saturates saturable core 13, output terminal A becomes positive relative to output terminals B and B'. When control circuit 30' saturates saturable core 13', output terminal B' becomes positive relative to the output terminals A' and A. The degree of saturation of either saturable cores 13 or 13' will regulate the magnitude of the voltage appearing across the output terminals A and B'.

Figure 2 discloses a single phase full wave modification of Figure 1. In order to simplify the understanding of the embodiments of the invention, like reference numbers will be used to identify corresponding elements in this and subsequent figures. In Figure 2, the secondary windings 16 and 16' of the transformers 15 and 15' are centertapped and the series output circuits 17 and 17' are connected across one half of the centertapped secondary windings 16 and 16', respectively. A secondary unidirectional device 40 is poled and connected by conductors 41 and 42 from the third terminal of the centertapped secondary winding 16 to the junction of unidirectional device 18 and the terminal A of the resistor 19. A secondary unidirectional device 40' is poled and connected by conductors 41' and 42' from the conductor 20 to the third terminal of the secondary winding 16'.

In the three phase embodiment of the invention disclosed in Fig. 3, the source 2 is a three phase Y voltage generator energizing A.C. lines 11, 111 and 1011 and the transformers 15 and 15' are three phase Y connected transformers. In order to simplify the description of the disclosure, numbers 10 to 70 will be assigned to the circuits and the components for the first voltage phase, 100 to 170, will be assigned for the corresponding circuits and components of the second voltage phase and 1000 to 1070 will be assigned to the corresponding circuits and component of the third voltage phase. The three primary circuits for the transformer 15 are 10, 100 and 1000 while the three primary circuits for the transformer 15' are 10', 100' and 1000'. The primary circuits 10 and 10' are connected to A.C. line 11, primary circuits 100 and 100' are connected to A.C. line 111, and primary circuits 1000 and 1000' are connected to A.C. line 1011. Primary unidirectional devices 50a, 150a and 1050a are connected in series with reactor windings 12a, 112a and 1012a, these windings being disposed on saturable cores 13a, 113a and 1013a, respectively, while transformer primary windings 14, 114 and 1014 are in the primary circuits 10, 100 and 1000, respectively. Shunted across the series combinations of reactor windings and primary unidirectional devices are other series combinations as follows: a reactor winding 12b disposed on a saturable core 13b and a primary unidirectional device 50b across the series combination of 12a and 50a; a reactor winding 112b disposed on a saturable core 113b and a primary unidirectional device 150b across the series combination of 112a and 150a; and a reactor winding 1012b disposed on a saturable core 1013b and a primary unidirectional device 1050b across the series combination of 1012a and 1050a. Unidirectional devices 50b, 150b and 1050b are oppositely poled to unidirectional devices 50a, 150a and 1050a. In a similar manner, reactor windings 12a' and 12b', unidirectional devices 50a' and 50b', and saturable cores 13a' and 13b' are disposed in the primary circuit 10'; reactor windings 112a' and 112b', unidirectional devices 150a' and 150b', and saturable cores 113a' and 113b' are disposed in the primary circuit 100'; and reactor windings 1012a' and 1012b', unidirectional devices 1050a' and 1050b' are disposed in the primary circuit 1000'. A bias circuit 51 comprises a series connection of windings 52a and 52b disposed on the cores 13a and 13b in push pull flux relationship, windings 152a and 152b disposed on the cores 113a and 113b in push pull flux relationship, windings 1052a and 1052b disposed on the cores 1013a and 1013b in push pull flux relationship, windings 52a' and 52b' disposed on the cores 13a' and 13b' in push pull relationship, windings 152a' and 152b' disposed on the cores 113a' and 113b' in push pull relationship and the windings 1052a' and 1052b' disposed on the cores 1013a' and 1013b' in push pull relationship, respectively. The bias circuit 51 is connected across a D.C. voltage source 53 to preset the flux density at the proper unsaturated quiescent level in the cores 13a, 13b, 113a, 113b, 1013a, 1013b, 13a', 13b', 113a', 113b', 1013a' and 1013b'. A common control circuit 60 which will saturate all the cores of all the primary circuits to either the transformer 15 or 15' comprises windings 61a and 61b disposed on the cores 13a and 13b in push pull flux relationship, windings 161a and 161b disposed on the cores 113a and 113b in push pull flux relationship, windings 1061a and 1061b disposed on the cores 1013a and 1013b in push pull flux relationship, windings 61a' and 61b' disposed on the cores 13a' and 13b' in push pull flux relationship, windings 161a' and 161b' disposed on the cores 113a' and 113b' in push pull flux relationship and the windings 1061a' and 1061b' disposed on the cores 1013a' and 1013b' in push pull flux relationship, respectively. The windings associated with the primary circuits 10', 100' and 1000' are in opposition to the windings associated with the primary circuits 10, 100, and 1000. By the saturation arrangement disclosed, a current in the control circuit 60 in one direction will cause one of the two three phase transformers to become energized and the same current in the reverse direction in the control circuit 60 will cause the other three phase transformers to become energized.

The secondary windings 16, 116 and 1016 of the transformer 15 and the secondary windings 16', 116' and 1016' of the transformer 15' are connected in Y arrangement, the windings 116 and 116' being reversed relative to the other two windings of its associated transformer. Output circuits 17, 117, 1017, 17', 117', and 1017' are connected to secondary windings 16, 116, 1016, 16', 116' and 1016', respectively. Output circuits 17, 117, 1017, 17', 117' and 1017' include secondary unidirectional devices 18, 118, 1018, 18', 118' and 1018', respectively. Output circuits 17, 117 and 1017 include a common resistor 19 while output circuits 17', 117' and 1017' include a common resistor 19'. Secondary unidirectional devices 40, 140, 1040, 40', 140' and 1040' are poled and connected by conductors 41 and 42, 141 and 142, 1041 and 1042, 41' and 42', 141' and 142' and 1041' and 1042', respectively, from the conductor 20 to the junction between the secondary transformer windings 16, 116, 1016, 16', 116' and 1016' and the secondary unidirectional devices 18, 118, 1018, 18', 118' and 1018', respectively. When transformer 15 is energized, by providing a current of the proper polarity in the control circuit 60, terminal A of the resistor 19 is polarized positive with respect to terminals B and B' of resistors 19 and 19'. When the current in the control circuit 60 is reversed, the transformer 15' is energized and the output terminal B' of resistor 19' is polarized positive with respect to terminals A' and A.

It is to be understood that various modifications of the invention other than those above described may be effected by persons skilled in the art, without departing from the principle and scope of the invention as defined in the appended claims.

What is claimed is:

1. A reversible magnetic controller comprising an A.C. line adapted to receive at least one voltage phase therein, two primary circuits connected across each voltage phase of the said A.C. line, a magnetic core in each primary circuit, a reactor winding disposed on each of the said magnetic cores, two transformers, each transformer having a primary and secondary winding for each voltage phase on the said A.C. line, each of the said primary circuits including in series one of the said reactor windings and one of said primary transformer windings, means to saturate selectively the said magnetic cores in one of the two primary circuits, and a series output circuit connected across each of the said secondary transformer windings, said output circuit including a resistor and a secondary unidirectional device, the series output circuits of one of the said transformers being connected to the series output circuits of the other of said transformers at one terminal of each of the said resistors, and the said secondary unidirectional device being poled away from the junction of the said resistors between the said series output circuits of the said two transformers; the said means to saturate selectively the said magnetic cores in one of the two primary circuits comprising a second magnetic core in each said primary circuit, a second reactor winding disposed on each the second magnetic cores, a first and second primary unidirectional device, the said first primary unidirectional device being connected in series with the first mentioned reactor winding, the said second primary unidirectional device being connected in series with the said second reactor winding, the series combinations of reactor windings and unidirectional devices being connected in shunt, the said first and second primary unidirectional devices being oppositely poled, a bias circuit having in push pull series connection a first and second bias winding inductively disposed on the first mentioned magnetic cores and the said second magnetic cores, respectively, and a control circuit having in push pull series connection a first and second control winding inductively disposed on the first mentioned magnetic cores and the said second magnetic cores, respectively, whereby the said two transformers are selectively energized so as to make available D.C. voltage across the resistor terminals.

2. A reversible magnetic controller as claimed in claim 1 wherein the said A.C. line is a single phase line, and the said transformers are single phase transformers.

3. A reversible magnetic controller as claimed in claim 2 wherein each of the said secondary transformer windings is a centertapped secondary transformer winding, each of the said series output circuits is connected across one half of one of said centertapped secondary transformer windings and there is provided a second pair of secondary unidirectional devices each of said secondary devices being connected across the one of said centertapped secondary transformer windings and one of the first mentioned secondary unidirectional devices, the said secondary unidirectional devices being poled away from the junction of the said resistors, whereby the two transformers are adapted to polarize the terminals across the two resistors with a reversible full wave D.C. output.

4. A reversible magnetic controller as claimed in claim 1 wherein the said A.C. line is a three phase line and the said transformer is a three phase transformer.

5. A reversible magnetic controller as claimed in claim 4 wherein there is provided a second secondary unidirectional device connected between the junction of the said secondary transformer winding and the first mentioned secondary unidirectional device and the junction of the said resistors, said second secondary unidirectional devices being poled away from the junction of the said resistors.

6. A reversible magnetic controller as claimed in claim 5 wherein the said three phase transformer is connected in a Y arrangement, one of the said secondary transformer windings being reversed in said arrangement.

7. A reversible magnetic controller as claimed in claim 1 wherein the said A.C. line is single phase, and the said transformers are single phase and there is provided two control circuits for the said means to saturate selectively the said magnetic cores in one of the said primary circuits, each of the said two control circuits including a control winding disposed on each magnetic core.

References Cited in the file of this patent

UNITED STATES PATENTS

| | | | |
|---|---|---|---|
| 2,723,372 | Eagan et al. | Nov. 8, | 1955 |
| 2,745,056 | Zucchhino | May 8, | 1956 |
| 2,777,073 | Fingerett et al. | Jan. 8, | 1957 |
| 2,855,560 | Sanders | Oct. 7, | 1958 |